No. 828,249. PATENTED AUG. 7, 1906.
A. SIEMS.
METALLIC PACKING FOR STUFFING BOXES.
APPLICATION FILED SEPT. 12, 1905.

Witnesses
Inventor

UNITED STATES PATENT OFFICE.

ALBERT SIEMS, OF VIENNA, AUSTRIA-HUNGARY.

METALLIC PACKING FOR STUFFING-BOXES.

No. 828,249. Specification of Letters Patent. Patented Aug. 7, 1906.

Application filed September 12, 1905. Serial No. 278,135.

*To all whom it may concern:*

Be it known that I, ALBERT SIEMS, foreman, a citizen of the Empire of Austria-Hungary, residing at Vienna, in the Empire of Austria-Hungary, have invented certain new and useful Improvements in Metallic Packing for Stuffing-Boxes, of which the following is a specification, reference being had therein to the accompanying drawings.

This invention relates to stuffing-box packings entirely made of metal; and it has for its object to prevent the bad effects of the steam-pressure which forces the rings with detrimental friction against the piston-rod.

Figure 1:
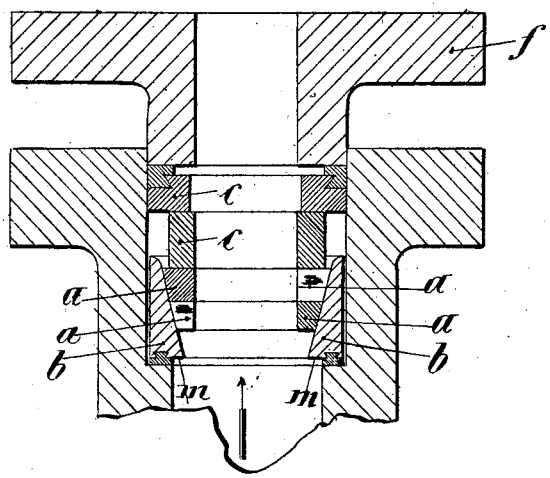
Figure 2:
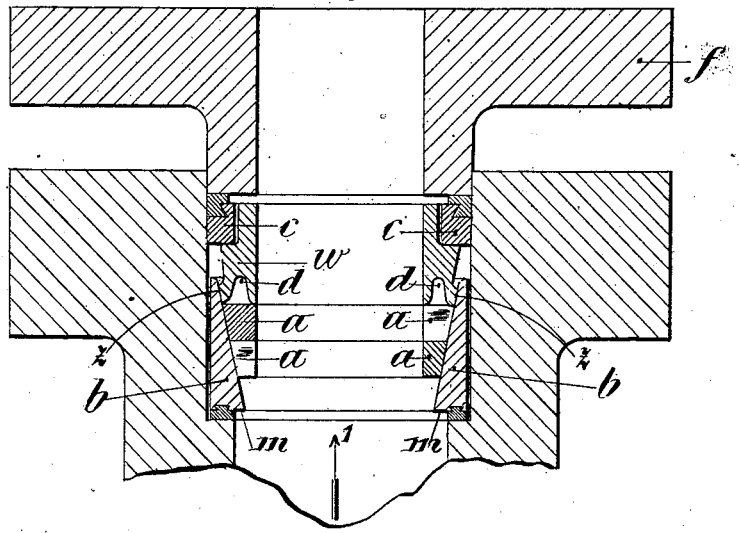

In the accompanying drawings, forming part of this specification, Figure 1 is a section through a stuffing-box of known construction. Fig. 2 is a section through a stuffing-box embodying the new features, as will be described hereinafter and pointed out in the claim.

In these stuffing-box packings in which, as shown in Fig. 1, split rings $a$ $a$ are employed, which are conically formed upon their outer periphery and which are surrounded by a hopper-shaped liner $b$ upon the free lower end face $m$, of which the steam acts upwardly in the direction indicated by the arrow 1, the conical rings $a$ $a$ are tightened up by the transmission of the pressure of the flanged collar $f$ onto the rings $a$ by means of appropriate parts $c$. In operation, however, there is added to the pressure with which the parts are assembled, which is transmitted through the flanged collar $f$, that pressure which, as already stated, arises from the fact that the hopper $b$ is pressed upward by the steam-pressure acting upon its lower face $m$ in the direction of the arrow 1. By this means the conical rings $a$ $a$ are still more vigorously pressed together. This compression of the rings $a$, which is produced by the steam-pressure, is desirable to a certain extent, as by this means the expansion of the rings $a$, which is caused by heating, is nullified. In other respects, however, its action is prejudicial, because the rings $a$ are pressed against the piston-rod more than is necessary for forming a tight joint, thereby causing unnecessary friction and excessive wear of the rings $a$ and rod $v$. Now in order not to entirely prevent this compression of the rings $a$ by the upward pressure of the hopper-shaped liner, while, on the other hand, preventing it from exceeding a certain limit, in accordance with the present invention is arranged, as shown in Fig. 2, the intermediate part $w$, acting upon the split rings $a$ $a$, the said part $w$ being conically formed at $z$ upon its outer periphery in such a manner that it bears against the conical inner face of the liner $b$ and acts upon this latter, so that its upward displacement can only take place to the extent that the part $w$ is able to penetrate into the hopper $b$.

In order that excessive resistance may not be opposed to the sliding upward of the hopper $b$, a channel $d$ is formed on the end face of the part $w$, so that the conically-formed outer wall $z$ is able to yield somewhat.

Having now particularly described and ascertained the nature of my said invention and in what manner the same is to be performed, I declare that what I claim is—

A packing for stuffing-boxes comprising the split cones $a$, $a$, and the counterbored ring $b$ in combination with an intermediate ring $w$ adapted to transfer the pressure of the flange-collar $f$ upon the cones $a$ $a$, having a deep annular groove $d$ in its front surface and a bevel at the outer edge which corresponds to the bore of the ring $b$, substantially as described and for the purpose set forth.

In testimony whereof I have hereunto affixed my signature in presence of two witnesses.

ALBERT SIEMS.

Witnesses:
 FRIEDRICH BINDER,
 ALVESTO S. HOGUE.